United States Patent [19]

Andriewsky

[11] Patent Number: 4,611,678
[45] Date of Patent: Sep. 16, 1986

[54] HEAVY DUTY WEIGHING MACHINE HAVING HIGH PRECISION AND RESOLUTION FEATURES

[76] Inventor: Miguel S. Andriewsky, 5548 Jose Hernandez Street, Munro (1605), Prov. of Buenos Aires, Argentina

[21] Appl. No.: 718,933

[22] Filed: Apr. 2, 1985

[30] Foreign Application Priority Data

Nov. 7, 1984 [AR] Argentina ............................... 298540

[51] Int. Cl.⁴ ............................ G01G 3/14; G01L 1/22
[52] U.S. Cl. .................................. 177/211; 73/862.65
[58] Field of Search ...................... 177/211; 73/862.65

[56] References Cited

U.S. PATENT DOCUMENTS 2,899,191  8/1959  Hunt ..................................... 177/211
3,938,603  2/1976  Shoberg et al. ..................... 177/211
4,457,385  7/1984  Provi ................................ 177/256 X

FOREIGN PATENT DOCUMENTS 0935719  10/1980  U.S.S.R. ........................... 73/862.65

Primary Examiner—George H. Miller, Jr.
Attorney, Agent, or Firm—Ladas & Parry

[57] ABSTRACT

A big weighing machine where a heavy load generates proportional bending moments in a pair of parallel beams having strain-gauges. Resolution is greatly increased by making each beam elastic in its longitudinal direction so that end points thereof where load and reactive forces are applied keep their longitudinal position when the beams bend under load, so that variation of the beam length may result from beam bending without horizontally urging the beam ends. Each beam comprises two interlinked horizontal members, each integral with a respective beam end plate, so that the beams move vertically together and longitudinally independent of each other. Each member is rigid to avoid error magnification brought about by excessive beam deflection, and the strain-gauges are symetrically connected at flexible portions of the end plates to obtain a reading independent of load eccentricity.

10 Claims, 11 Drawing Figures

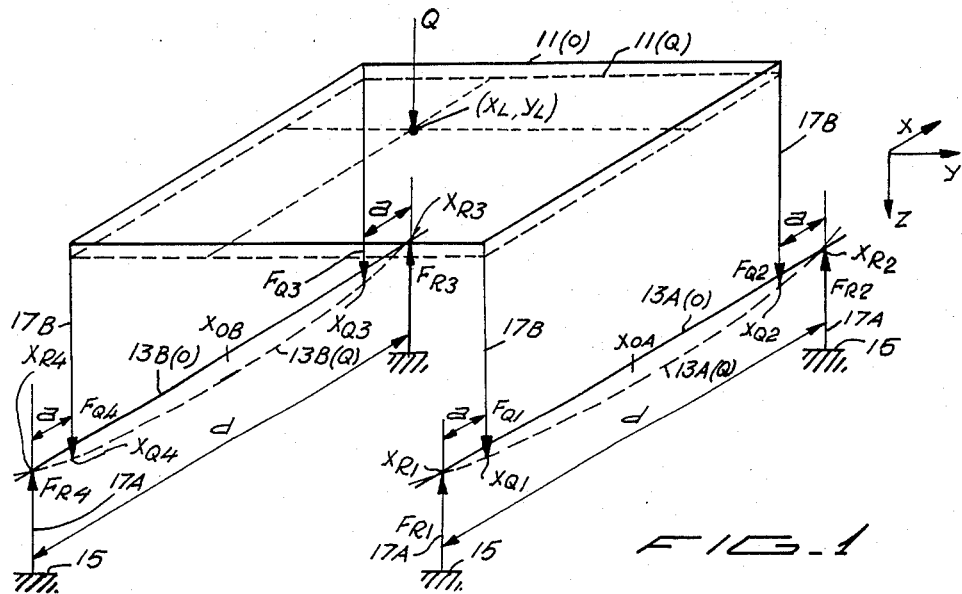
FIG_1
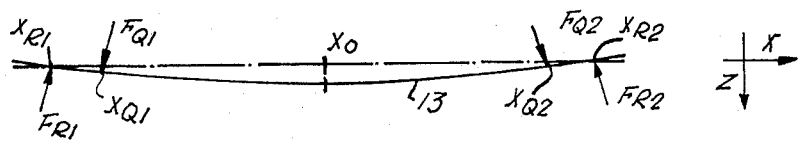
FIG_2A
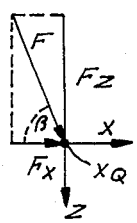
FIG_2B

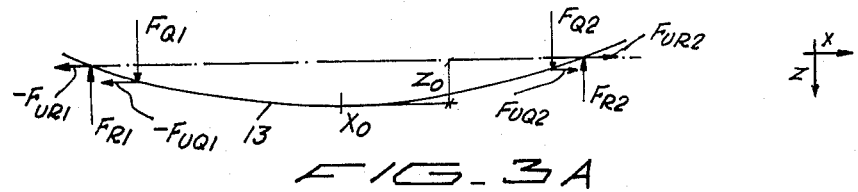
FIG_3A
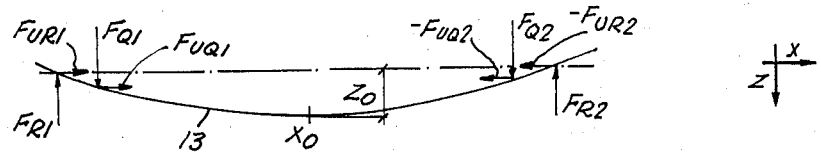
FIG_3B
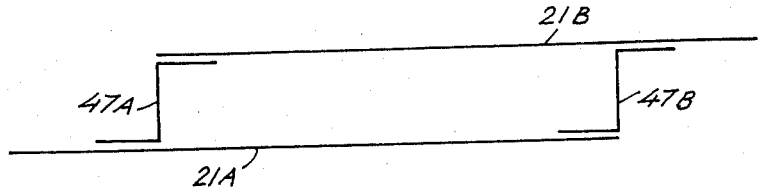
FIG_7A
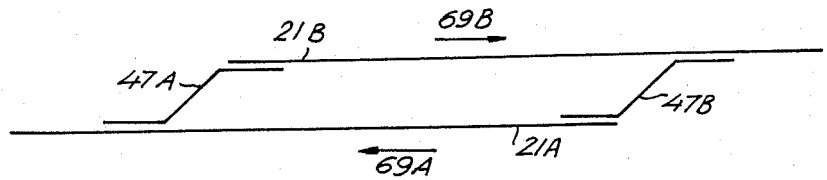
FIG_7B
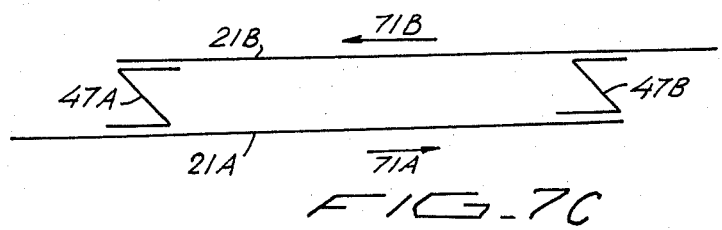
FIG_7C

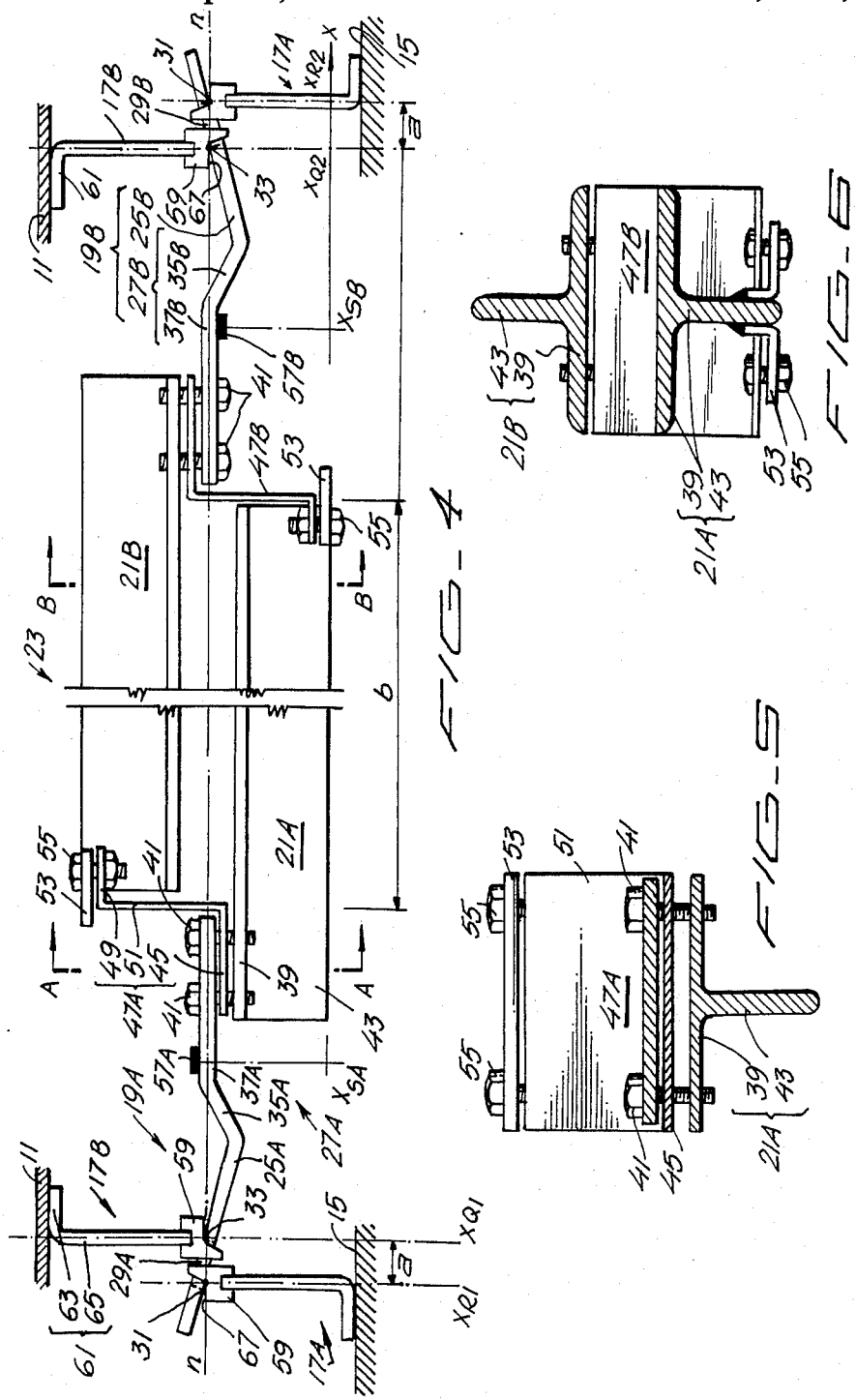

HEAVY DUTY WEIGHING MACHINE HAVING HIGH PRECISION AND RESOLUTION FEATURES

FIELD OF THE INVENTION

The present invention is related to dynamometer machines and particularly to improvements in automatic weighing machines, wherein a heavy load to be weighed is placed on a platform of the weighing machine, and a weight indication or reading independent of the load's relative position may be obtained. The present invention is particularly related to automatic weighing machines, i.e. those of the dynamometer type giving a read-out automatically upon a load being placed on their platform.

The type of weighing machine referred to herein, generally comprises a pair of side-by-side symmetrical beams lodged between a frame and a tray or platform, the latter being adapted to receive and support different weight loads. The beams are held in place at each end portion thereof by pairs of essentially vertical coupling members connected to transverse load the beam at each end portion in response to a weight load on the platform; which pairs of coupling members comprise, connected to each end portion of each beam, one member supporting the platform to transmit a load force, and another member similarly resting on the frame to transmit a reactive force dependent on load parameters. These load parameters are weight magnitude and eccentricity; the latter is defined by the position of the load in relation to the platform. The transverse loading of the beams creates bending moments at a middle portion thereof due to the longitudinal offset between the respective coupling points where the coupling members apply the load and the reactive forces to each end portion of the beams.

DESCRIPTION OF THE PRIOR ART

It is already known in the art that an accurate weight read-out may be obtained regardless of the relative position of the load on the platform of a weighing machine, i.e. even when the eccentricity of the point of application of the resultant force applied by the load on the platform is great. U.S. Pat. No. 2,899,191 explains that the sum of the bending moments at the longitudinal centre of each beam may vary only according to the magnitude of the weight, and is independent of the eccentricity of the load on the receiving platform.

My previous U.S. patent application Ser. No. 701,937 (still pending and filed Feb. 15, 1985 as a CIP on my earlier U.S. patent application Ser. No. 534,345 filed on Sept. 21, 1983) teaches how measuring precision may be vastly improved by featuring beams with V-shaped ends to reduce so-called "Angle" and "Bending Moment" errors in these types of weighing machines. The Angle error affects the transfer function relating the weight of the load with the bending moment at the centre of each beam, and can be kept low even in big machines employing long beams, as taught therein. Conversely, the Bending Moment error arises from the effect of horizontal forces, which are disturbing, because weight is an inherently vertical vector parameter. Thus, any bending moment components due to non-vertical forces (i.e. horizontal force components) acting along different horizontal planes evidently introduce Moment errors in the overall weight measurement. As explained more fully in my cited U.S. patent application Ser. No. 701,937, horizontal forces result from a combination of:

(a) horizontal components of the load and reactive forces transmitted by the coupling members to the beams;

(b) friction forces orignating between the beams and the coupling members during flexure; and (c) elastic forces generated by the coupling members if they are allowed to yield under load.

Because elastic forces are prefered to friction forces, in view of that the latter are responsible for hysteresis, the coupling members are generally designed to yield with beam flexure, rocking in a small arc as the beam centre moves vertically.

In large weighing machines, the greater deflection of the centre of longer beams considerably magnifies the Angle and Moment errors. To overcome this, my previously mentioned patent application U.S. Ser. No. 701,937 suggests that profiles be fixed along most of the length of the most central part of the beams to reduce deflection without affecting the precise detection of the bending moment due to the resultant vertical forces.

When the loads are heavy, an engineering problem arises (in addition to the one regarding excessive deflection of the beam centre as mentioned before) with the coupling members linking the beams respectively to the machine's frame and platform. In particular, when vertical forces on the order of 200 kg or more are to be transmitted by the coupling members, the elastic coupling members shown in my cited application U.S. Ser. No. 701,937 become inadequate. That is, the relatively simple procedure of cutting out the slots in their structure to provide the required low elasticity coefficient overweakens these members, resulting in that they cannot rock in a small arc before the point of maximum elasticity is surpassed and plastic deformation sets in; in other words, the members literally collapse.

Consequently, thich rigid coupling members must be used in heavy duty weighing machine which, together with the (at least partly flexible) beams, bring the friction and resultant hysteresis affair back into consideration, partially defeating the purpose of the invention disclosed in my previously cited application U.S. Ser. No. 701,937; when it is attempted to apply that invention as disclosed therein to big weighing machines.

SUMMARY OF THE INVENTION

An object of the present invention is to improve the precision and resolution of the weighing machines adapted for heavy loads.

Another object of the present invention is to eliminate hysteresis caused by the friction forces.

A further object of the present invention is to reduce the displacement of the beam centre, without substantially affecting sensitivity, in heavy duty weighing machines needing relatively long beams.

Yet another object of the invention is to provide long beams for heavy duty weighing machines, which beams may be suitably used with rigid coupling members, without substantially increasing measurement errors.

These and other objects are attained with the weighing machine of the present invention, which proposes that the beams be elastic in the longitudinal direction. The desired effect of this novel idea is that the beam centre may deflect under load without longitudinally displacing the beam end portions; graphically, when the middle portion curves either upwards or downwards, the beams stretch or contract longitudinally, resulting in that the beam end portions are not urged towards or away from each other because the real length of the beam is free to vary elastically. The immediate consequence of this is that the longitudinal position of the beam end portions remain practically constant while the beam centre moves vertically, and thus it is not necessary for the coupling members to rock therewith to avoid the friction forces. Thus, simple rigid coupling members may be used without producing these friction forces. Furthermore, the longitudinal elasticity absorbs the work of the undesired longitudinal forces, storing it as potential energy, before it stresses the beam.

In the preferred embodiment, the beams are composite in structure, comprising a pair of longitudinally extending rigid members overlapping each other at the beam middle portion. Each rigid member integrally contains a respective beam end portion which may be flat or V-shaped, preferably the latter. The two rigid members are interconnected by links which cause them to move integrally with each other in the vertical direction when subjected to vertical forces (i.e. weight), but allowing freedom of movement in the horizontal longitudinal direction. This freedom of movement permits the pair of rigid members to "slide" along each other under the effect of horizontal forces, to absorb the work (stored as elastic potential energy) of the horizontal forces and avoid them generating detectable error strains in the beams. More importantly, this "sliding" motion between the pair of rigid members causes the effect of lengthening the beam when the curvature of the middle portion increases with deflection, to compensate for the two end portions keeping their original longitudinal position.

BRIEF DESCRIPTION OF THE DRAWINGS

FIG. 1 is a tri-dimensional schematic of a weighing machine, of the type addressed by the present invention, shown with full lines when in an unloaded state, and in dashed lines when in a finite (i.e. non-zero) state.

FIG. 2A schematically illustrates how the coupling members may apply undesired horizontal forces to the beams; whilst FIG. 2B is a magnification of one of the coupling points of the beam of FIG. 2A, showing with more clarity the actual direction of a load force, and how the latter resolves to finite horizontal and vertical components.

FIGS. 3A and 3B show how friction forces are generated in operation, to illustrate why hysteresis is originated due to their dependency on beam deflection direction.

FIG. 4 is a side view (in the xz-plane) of one of the long beams of the present invention with its associated rigid coupling members.

FIGS. 5 and 6 are cross-sections taken through yz-planes A—A and B—B respectively in FIG. 4.

FIGS. 7A, 7B and 7C schematically illustrate in a rather exaggerated but graphic manner, how the beam in FIG. 4 deforms longitudinally, to neutralize the horizontal forces.

DETAILED DESCRIPTION OF THE DRAWINGS

Making reference to FIG. 1 of the drawings, a weighing machine is shown schematically, including a platform or tray 11, which may move vertically from its unloaded position indicated by a reference symbol 11(O) to a loaded position 11(Q). A force $\overline{Q}$ represents the weight or force exerted by a load at a coordinate point $(X_L, Y_L)$ of the platform 11. Point $(X_L, Y_L)$ could well be located anywhere along tray 11, and in general there will be a multiplicity of forces $\overline{Q}$ distributed on tray 11; however, their effect on the overall weight measurement is simply the summation of their individual effects. Platform 11 is suitably coupled to a pair of horizontal elastic beams 13A, 13B so as to apply four vertical forces $\overline{F}_{Q1}, \overline{F}_{Q2}, \overline{F}_{Q3}, \overline{F}_{Q4}$ at the application or coupling points $X_{Q1}, X_{Q2}, X_{Q3}, X_{Q4}$, respectively. In turn, beams 13A, 13B have four coupling points $X_{R1}, X_{R2}, X_{R3}, X_{R4}$ resting on a base or frame 15 (not illustrated in FIG. 1), to which it is coupled and supported thereby. This resting or supporting action is indicated by reactions $\overline{F}_{R1}, \overline{F}_{R2}, \overline{F}_{R3}, \overline{F}_{R4}$, which react to load forces $\overline{F}_{Q1}, \overline{F}_{Q2}, \overline{F}_{Q3}, \overline{F}_{Q4}$. The reference numerals 17A, 17B indicate the location of coupling means (not illustrated in detail in FIG. 1) which transmit the load forces and reactions $\overline{F}$ to the beams 13. The coupling rest points $X_R$ on each beam 13 (when generalizing, the subscripts A, B, etc. or 1, 2, etc. are omitted from the reference numerals, e.g. beams 13A, 13B are referred to as 13, etc.) are spaced apart by a distance d. Rest point $X_{R1}$ is separated from supporting point $X_{Q1}$ by distance a, whilst points $X_{R2}, X_{R3}, X_{R4}$ are likewise separated respectively from points $X_{Q2}, X_{Q3}, X_{Q4}$ equal distances a. It can be shown that at a centre point $X_O$ of beam 13, from which rest points $X_R$ are equidistant (and obviously application points $X_Q$ likewise), the bending movement $M_O$ is:

$$M_O = \tfrac{1}{2}(F_{Q1} + F_{Q2})a \qquad (1)$$

which is independent of the relative longitudinal position $X_L$ of the load $\overline{Q}$ on platform 11, for which reason centre point $X_O$ is also known as the invariant point. As described in detail further on, strain-gauges are operatively coupled to the beams 13, in a way to detect the longitudinal elongation precisely at their respective invariant or centre point $X_O$, resulting from the bending moment $M_O$.

Cartesian coordinates are used in the present description to specify axis and directions as illustrated. The x-axis extends in the longitudinal horizontal direction, the y-axis in the transverse horizontal direction and the z-axis in the transverse vertical direction, the x-, y- and z-axes being mutually orthogonal. Consequently, xy is a horizontal plane, xz a longitudinal vertical plane, and yz a transverse vertical plane.

Before describing in detail the beam structures 13 in FIG. 1, the origins of horizontal forces $\overline{F}_H$ acting thereon are now explained, with the assistance of FIGS. 2A and 2B to being with. FIG. 2A schematically shows an xz-plane containing one of the beam structures 13 transversely loaded by forces $\overline{F}_{Q1}, \overline{F}_{Q2}, \overline{F}_{R1}, \overline{F}_{R2}$, (in general $\overline{F}_Q, \overline{F}_R$, or $\overline{F}$) at respective coupling points $X_{Q1}, X_{Q2}, X_{R1}, X_{R2}$. it is practically impossible to avoid slight inclinations of the coupling members 17, which inclinations cause the vertical lines of action of each force $\overline{F}$, transmitted from the platform 11 (likewise frame 15) to the coupling member 17 and from the same to the beam structure 13, to be longitudinally offset. Consequently, a disturbing moment is generated at application points $X_Q$ (and $X_R$), which in practice derives in that the forces $\overline{F}$ are in actual fact generally inclined in the xz-plane, forming an angle $\beta$ with respect to the z-direction, as illustrated in FIG. 2B.

This figure shows a magnification of the action of a force $\overline{F}$ on the beam 13 at coupling point $X_Q$ (this is also applicable to rest points $X_R$). Due to the inclination of $\overline{F}$, the latter resolves into a vertical component $\overline{F}_Z$ and a horizontal component $\overline{F}_X$. The vertical component $\overline{F}_Z$ is the true contribution of the weight Q of the load on the platform 11. Because $$\beta \approx 90° \rightarrow |F_Z| \approx |F|, \tag{2}$$

no distinction is generally made herein between $\overline{F}$ and $\overline{F}_Z$. The horizontal component or force $\overline{F}_X$ is not determined unequivocally, at least not directly, by the load Q, and is thus a disturbing factor. It can be easily realized that its magnitude is given by:

$$|F_X| = |F| \tan \beta \tag{3}$$

All the forces $\overline{F}$, whether load forces $\overline{F}_Q$ applied to points $X_Q$ or reactions $\overline{F}_R$ applied to points $X_R$, resolve to horizontal components $\overline{F}_X$ all of which contribute erroneous horizontal forces $\overline{F}_H$, and to true vertical components $\overline{F}_Z$.

In the prior art, further contributions to the horizontal forces $\overline{F}_H$ can be made by friction forces $\overline{F}_U$, originating between the beams 13′ and the coupling members 17 during deflection of the former, as depicted in FIGS. 3A and 3B. Both these figures show friction forces $\overline{F}_{UQ1}$, $\overline{F}_{UQ2}$, $\overline{F}_{UR1}$, $\overline{F}_{UR2}$ due to relative sliding movement between the beams 13′ and the coupling members 17. It may be appreciated that this relative sliding movement is generally horizontal so that the friction forces $\overline{F}_U$ may be considered as horizontal forces $\overline{F}_H$, and, furthermore, that the friction action increases with the rigidness of the coupling members 17.

Furthermore, the orientation of the friction forces $\overline{F}_U$ depends on the direction in which the beam 13′ is moving vertically, i.e.

$$\overline{F} = \pm i\mu \overline{F}_Z \tag{4}$$

because when the vertical movement of the beam 13′ changes direction, the beam 13′ slides the other way along the face of the coupling members 17 (i denotes perpendicularity between cause $\overline{F}_Z$ and effect $\overline{F}_U$). In this regard, FIG. 3A shows the friction force vectors $\overline{F}_U$ when the beam 13′ is moving downwards (speed z>0), and FIG. 3B when it is moving upwards (z<0). As a consequence of the change of direction of the friction forces $\overline{F}_U$, the deflection $z_O$ at centre $X_O$ of the beam 13′ for a given load Q differs for upscale and downscale measurements. As it is necessary for the beams 13′ to be elastic in the vertical z-direction, the loaded beams 13′ will oscillate (i.e. descend and ascend alternatively), and successively invert the direction of the friction forces $\overline{F}_U$ before settling in its stable state, for which reason the output signal will be subjected to hysteresis.

According to what has been explained beforehand, and in my cited application U.S. Ser. No. 701,937, the horizontal forces $\overline{F}_{HQ}$, $\overline{F}_{HR}$ that develop at each coupling point $X_Q$, $X_R$, if they become vertically offset a distance $z_H$, may produce a Moment error magnitude $M_H$ equal to $$M_H = \tfrac{1}{2} F_H \cdot z_H = \tfrac{1}{2}(F_X \pm F_U) \cdot z_H = \tfrac{1}{2}(\pm \mu + \tan \beta) F_Z \cdot z_H \tag{5}$$

in the bending moment $M_O$ picked up by the strain-gauges 57.

Consequently, the bending moment component $M_H$ detected by the strain-gauges 57 depends on different types of variables, such as $\beta$ and $\mu$, apart from the true vertical forces $\overline{F}_Z$ dependent on the load Q.

Reference is now made to FIG. 4. The weighing machine comprises a plate, tray or platform 11 and a frame 15; platform 11 is adapted to eventually receive a load Q (FIG. 1) within a desired weight range. A pair of beams 13A, 13B is lodged between frame 15 and platform 11 by two sets of four rigid coupling members 17A, 17B, each. The lower set comprises members 17A fixed to the frame 15, and the upper set members 17B fixed under the platform 11.

Beam 13 is elongated in the direction of the longitudinal x-axis and comprises two endplates 19A, 19B and a pair of interconnected rigid members 21A, 21B vertically spaced from each other; the latter are comprised by two T-section profiles 21 located one above the other and form a beam middle portion 23. On each endplate 19 there is defined an outer beam end portion 25A, 25B and an inner beam intermediate portion 27A, 27B flanking the middle portion 23 of each beam 13.

Each end portion 25 features an orifice 29 which has two opposite walls or sides which define a pair of straight edges 31, 33 on the under- and topside respectively of beam 13. Both edges 31, 33 are perpendicular to the x-axis and are spaced apart from one another by an exact distance a, which may be 15 mm in a beam (d=) 2 m long. When describing the physical structure of the beams 13, the exact term "edges" is used; however, when explaining a principle (in the xz-plane), the term "points" is preferred herein for illustrativeness. The uniformity of the value a is critical for each beam 13; consequently, the four endplates 19 are stamped with the same mould.

Two inclined faces 25, 35 and a third horizontal face 37 may be distinguished in each endplate 19, the two faces 25, 35 forming an open V at the outermost part thereof. The intermediate portion 27 comprises the innermost inclined face 35 and the horizontal face 37 and its most important feature is its flexibility which provides detectable strains according to the load $\overline{Q}$. It should be understood that the V-shapes 25, 35 are not indispensable for the composite beam feature, and, theoretically, the latter may be applied to flat planar beams such as those disclosed in U.S. Pat. Nos. 2,899,191 and 3,366,189 and in Argentine Pat. No. 216,822. In practice, however, it is desirable for the composite beam 13 to have V-shaped ends 25, 35 for improved precision: the composite feature providing longitudinal elasticity for neutralizing horizontal forces $\overline{F}_H$, and the V-shape feature for minimizing the Angle error in the load/-strain transfer function.

Each profile 21 extends in the longitudinal x-direction, and has a web 39 located in the vertical xz-plane to strengthen the beam middle portion 23 and, thus reduce the deflection of the centre-point $X_O$ of the beam 13 according to the expression $$z_O = (Fd^2 a / 8EI)(1 - 4a^2 / 3d^2) \approx (Fd^2 a / 8EI) \tag{6}$$

where I is the moment of inertia which increases with the cross-section and E the longitudinal elasticity or Young's modulus.

The profiles 21 are integrally secured, one to one, to the innermost face 37 of endplates 19 by bolts 41 screwed into flanges 43 of each profile 21. The same bolts 41 also clamp in place a horizontal bit 45 of one end of a thin link piece 47, sandwiching it between the two thicker members 37, 43.

Each beam 13 of the weighing machine includes two link pieces 47A, 47B, each formed from a steel plate bent into a zig-zag, thus defining two horizontal bits 45, 49, a vertical bit 51, and two internal alternate right angles 45⌢51 and 51⌢49. The second bit 49 of the link 47A is secured to an ear 53 fixed to the other profile 27B by a bolt and nut set 55. In FIGS. 3 and 4, the means interconnected by bolts 41, 55 are shown loosely connected just for the sake of clarity; it should be understood that the bolts 41, 55 are driven in tightly, clamping the connected elements to each other.

Similarly, the link 47B connects the other end of the profile 21A with the component formed by the other profile 21B and the endplate 19B, so that the profile 21A has approximately longitudinal freedom of movement in respect to its pair 21B and viceversa, due to that the thin vertical faces 51 provide freedom of bulge to both links 19.

FIG. 5 assists in clarifying the arrangement of the links 47 and how they are connected to the rest of the composite beam 13 of the present invention. It is desirable that the neutral axis n of this portion be contained in the same horizontal plane in which the coupling edges 31, 33 lie, especially when the weighing machine is loaded.

The pair of strain-gauges 57 are attached to each beam 13 at the predefined intermediate portions 21 thereof, equidistant about the centre $X_O$, to sense longitudinal elongations caused by beam stress in relation to the load on platform 11, according to eq.(1). A special oven-cured epoxy adhesive is used between strain-gauges 57 and beam 13 to assure good mechanical coupling. The four strain-gauges 57 (two from each beam 13) are electrically connected into a Wheatstone bridge, as is known in the art, to obtain a reading of the weight Q. As mentioned before, the intermediate portions 21 are flexible, to enhance the sensitivity of the strain-gauges 57 operatively attached thereto. Preferably, two strain-gauges 57 are used for each beam 13, one strain-gauge 57A being fixed to the upper face of one of the flexible parts 27A of the beam 13, whilst the second strain-gauge 57B is fixed to the underface of the opposite flexible part 27B, so that the first strain-gauge 57A detects compressive strain and the other strain-gauge 57B tensile strain.

The strain-gauge connecting areas $X_{SA}$, $X_{SB}$ must be precisely predetermined. Referring to FIG. 4, it will be shown that there must be an exact left-right symmetry with respect to a central transverse yz-plane (not illustrated). As shown in U.S. application Ser. No. 701,937, between the inner coupling points $X_Q$, the moment $M_x$ follows the lineal function:

$$M_x = F_{R1} \cdot x - F_{Q1} \cdot (x-a) \qquad (7)$$

The moment $M_O$ at the centre or invariant point $X_O$ is constant for a given load Q, for which reason it can be seen that if the strain-gauge 57 connection points $X_{SA}$, $X_{SB}$ are symmetrical about $X_O$, then the sum of the respective bending moments $M_A + M_B$ at connecting points $X_{SA}$, $X_{SB}$ is always twice $M_O$, so the detected $M_A + M_B$ is also independent of the longitudinal eccentricity of the load Q (FIG. 1).

Consequently, Q may be measured by taking bending moments $M_x$ at symmetrical points $X_{SA}$, $X_{SB}$ about centre $X_O$. That is, in the same way as the coupling edges 31, 33 must be equally spaced at a distance a in both end portions 25, both mechanical connecting points $X_S$ must be separated an identical distance 1 from its nearest orifice 29. As illustrated in FIG. 4, the strain-gauges 57 are attached to the horizontal part 37 of each endplate 19; however it is also admissable to connect them to the inclined faces 35 thereof.

Each orifice 29 receives a pair of the rigid coupling members 17. Each member 17 of the upper set allows the platform 11 to rest on beam 13 and to transmit a force $\bar{F}_Q$ depending on the position $X_L$ and weight $|Q|$ of the load $\bar{Q}$; on the other hand, each member 17 of the lower set provides support for beam 13 and reaction $\bar{F}_R$ to the forces $\bar{F}_Q$.

The member 17 includes two plate members 59, 61 joined to each other. The plate member 61 is a thick common plate of iron SAE 1010 bent into an L-shape to form a base portion 63 and a side portion 65. The base portion 63 is welded to either the frame 15 or platform 11 as the case may be. The member 59 is also a plate member, adapted to receive the side portion 65 of the L-shaped member 61 in a transverse position. The shape of member 59 is adapted to penetrate orifice 29, and it defines a horizontal face 67 for contact with one coupling edge 31, 33 of orifice 29. The member 59 is made from SAE 1070 steel and is then tempered to ensure hardness. Edges 31 and 33 in FIG. 4 respectively identify points $X_R$ and $X_Q$ in FIG. 1. The arrangement of FIG. 4 is symmetrical in respect to the y-axis at $X_O$, therefore portion 19B is similar to portion 19A.

Its best advantages lie in its simplicity of construction, and in the fact that the distance a is directly determined by the longitudinal dimension of the orifices 29. Thus, no special precautions and adjustments are necessary when fixing the base plates 63 of the coupling members 17 to the frame 15 and to the platform 11.

When the weighing machine is loaded, the beam 13 is urged by load forces $\bar{F}_Q$ and reactions $\bar{F}_R$, thereby generating bending moments M(x) in the succesive sections along the beam 13. The visible effect of the load on the endplates 19 is to show a closing of the V defined by the inclined faces 25, 35, generating strains in the outer fibres of the flexible face 37 which are picked up by the strain-gauges 57.

Referring also to the schematical FIGS. 7A, 7B and 7C, the horizontal forces $\bar{F}_H$ which inevitably appear applied at the edges 31, 33 normally urge the corresponding profile 21 integral therewith, resulting in that the two profiles 21A, 21B move in the longitudinal x-direction relative to each other, deforming the otherwise 90° alternate angles 45⌢51 and 51⌢49. The deformation of the links 47 appears as a rotation of their central bits 51 in either clockwise or counterclockwise direction, according to the partial resultants of the horizontal forces $\bar{F}_H$ at either end 19 of the beam 13.

FIG. 7A, schematically shows the position of the members 21 and of the links 47 in an unloaded weighing machine, whilst FIGS. 7B and 7C show a rather exaggerated (for clarity sake) resultant position when the horizontal forces $\bar{F}_H$, are applied to the central portion 23 of the beam 75, according to whether the horizontal forces $\bar{F}_H$ act on each end to pull or push respectively the central portion 23, as indicated by arows 69A, 69B (FIG. 7B), 71A, 71B (FIG. 7C). In other words, the links 43 will rotate in a direction depending on whether the net effect of the horizontal forces on the members 21A, 21B is tractive (FIG. 7B) or compressive (FIG. 7C).

It should also be pondered that this embodiment avoids the shortening of the beam when the weighing machine is loaded, eliminating an important contribution to the horizontal forces. The most noteworthy feature of this embodiment, is that the two principal members 19A, 21A; 19B, 21B may move independently of each other in the longitudinal x-direction, and may only move together (i.e. integrally) in the vertical direction. In actual fact, from FIGS. 7A, 7B and 7C it can be seen that there is a small relative movement in the vertical direction, however, it has been found that this does not affect the weight measurement, because the links 47 completely transmit (rather than absorb) the bending moment M due to the vertical forces $\overline{F}_Z$ which are the useful forces indicative of the load Q. In general, the bending moment M generated by the load Q causes one of the links 47 to be subjected to traction and the remaining link 47 to compression, depending mainly on the longitudinal eccentricity of the load Q on the platform 11 (FIG. 1). It can be seen that the stress applied by the bending moment M on the links 47 is considerably reduced, for which reason the plates 47 may be very thin, e.g. 1/64", to contribute to their flexibility in the longitudinal x-direction; whilst the flexible plates 19 must be thicker, about $\frac{1}{8}$", to efficiently support the load $\overline{Q}$. For a given load force $\overline{F}$ on a beam 13, the bending moment M at each end portion is F.a, and the force f acting on each plate 47 is given by the expression $$f = (F \cdot a)/b \tag{8}$$

where b is the longitudinal distance between both links 47A, 47B. if, e.g., $$a = \tfrac{1}{2}'' \text{ and } b = 20'',$$

the reduction factor a/b is 40, so that for a load F=160 lbs, the plates 47 must be dimensioned to tolerate a force f of only 4 lbs.

Although the essential features of the invention have been brought out by means of a preferred embodiment, the invention is not limited to this embodiment and, on the contrary, extends to all alternative forms within the purview of the appended claims.

I claim:

1. A dynamometer machine for detecting the force magnitude of a load applied thereto, and including a pair of longitudinally elongated beam structures that bend under the effect of said load, and means for measuring a parameter related to the bending moments in said beams and deriving said force magnitude therefrom; the improvement whereby the actual length of said beam structures are longitudinally extendable, so that the length of each beam structure varies to compensate the bending of said beam structure due to said load.

2. The machine of claim 1, wherein each of said longitudinally extendable beam structures comprises a longitudinally elastic beam structure, whereby the ends thereof substantially keep their longitudinal position during load variation.

3. The machine of claim 1, wherein said beam structures are of composite structure; each beam structure comprising two longitudinally moveable members, each of which is integral with a respective end portion of the corresponding beam structure, and linkage means interconnecting said two members to move integral with each other in the vertical direction.

4. The machine of claim 3, wherein said machine is a weighing machine further comprising a frame, a platform adapted to receive and support the weight of a load, and coupling means for transmitting load forces and reactions from said platform and said frame respectively to each end portion of each beam structure, said coupling means comprising a plurality of substantially rigid coupling members in contact with said end portions and fixed to said frame and to said platform.

5. The machine of claim 3, wherein each of said moveable members comprises a rigid horizontal member located at the beam middle portion and an end plate fixed thereto.

6. The machine of claim 5, wherein the two rigid members belonging to each beam structure are located one above the other; and said linkage means comprise each a thin vertical plate bent into a zig-zag shape, which shape defines two horizontal end bits respectively joined to said rigid members, and a generally vertical flexible bit therebetween that allows said two rigid members to move longitudinally with respect to each other.

7. The machine of claim 5, wherein the longitudinal cross-sections of each of said end portions are V-shaped so that load and reactive forces derived from the application of said load are applied to each beam at substantially the same horizontal level.

8. A composite beam elastic in the longitudinal direction, in particular for use in heavy duty weighing machines in which the weight to be measured applies load forces on said beam transverse to the longitudinal direction thereof, said weighing-machine having a response virtually independent of longitudinal movement of said beam, said beam comprising a pair of elongated rigid members, a pair of elongated end plates and a pair of longitudinally spaced flexible link plates, said rigid members defining the middle portion of the beam, each of said flexible link plates respectively connects one of said rigid members with the other rigid member so that both said rigid members may move longitudinally with respect to each other but cannot substantially move independently from each other in a transverse direction, wherein each end plate is integrally fixed to a respective one of said rigid members, longitudinally projects outwards therefrom, and includes coupling means for applying the transverse load forces to said rigid members for subjecting said end plates to measurable flexure states.

9. The beam of claim 8, wherein each end plate further includes a longitudinally elongated and vertically flexible zone for connection with strain-gauge means, located intermediate said coupling means of said end plate and the rigid member fixed to said end plate.

10. The beam of claim 8, wherein said coupling means comprise an orifice in each end plate having a pair of longitudinally spaced opposite straight edges adapted to receive said load forces, the end plates are at least partially inclined so that all said coupling edges of the beam are substantially coplanar.

* * * * *

UNITED STATES PATENT AND TRADEMARK OFFICE
CERTIFICATE OF CORRECTION

PATENT NO. : 4,611,678
DATED : September 16, 1986
INVENTOR(S) : Miguel SINJEOKOV ANDRIEWSKY It is certified that error appears in the above-identified patent and that said Letters Patent is hereby corrected as shown below:

Title page, Item /19/ should read -- Sinjeokov Andriewsky --
Title page, Item /76/ should read Inventor: --Miguel SINJEOKOV ANDRIEWSKY--

Column 2, line 39

Consequently, thick rigid coupling members must be

Signed and Sealed this

Sixteenth Day of December, 1986

Attest:

DONALD J. QUIGG

Attesting Officer     Commissioner of Patents and Trademarks